US007193737B2

(12) United States Patent
Ha

(10) Patent No.: US 7,193,737 B2
(45) Date of Patent: Mar. 20, 2007

(54) METHOD OF STORING INITIAL USE DATE OF PRINTER AND INFORMING THE DATE

(75) Inventor: Woo-Hwa Ha, Yongin-shi (KR)

(73) Assignee: Samsung Electronics Co., Ltd., Suwoni-si (KR)

( * ) Notice: Subject to any disclaimer, the term of this patent is extended or adjusted under 35 U.S.C. 154(b) by 1141 days.

(21) Appl. No.: 09/759,351

(22) Filed: Jan. 16, 2001

(65) Prior Publication Data

US 2002/0024682 A1 Feb. 28, 2002

(30) Foreign Application Priority Data

Jan. 20, 2000 (KR) ................................ 2000-2576

(51) Int. Cl.
*G06F 15/00* (2006.01)
*G06K 1/00* (2006.01)

(52) U.S. Cl. .................................... 358/1.15; 358/1.16

(58) Field of Classification Search ................ 358/1.1, 358/1.9, 1.11–1.18; 368/28, 46
See application file for complete search history.

(56) References Cited

U.S. PATENT DOCUMENTS 5,263,152 A 11/1993 Smith et al. .................. 714/5
5,283,661 A * 2/1994 Klees ........................ 358/406
5,363,204 A * 11/1994 Millman ..................... 358/406
5,580,177 A * 12/1996 Gase et al. .................. 400/61
5,794,007 A 8/1998 Arrigotti et al. .............. 716/16
6,098,050 A 8/2000 Knoblock et al. ............ 705/28
6,151,707 A 11/2000 Hecksel et al. ............. 717/178
6,603,571 B1 * 8/2003 Nomoto ..................... 358/1.15
6,606,669 B1 * 8/2003 Nakagiri ..................... 719/327
6,671,063 B1 * 12/2003 Iida ........................... 358/1.15
6,989,910 B2 * 1/2006 Lomas et al. .............. 358/1.15
2001/0052995 A1 * 12/2001 Idehara ...................... 358/1.15
2003/0043395 A1 * 3/2003 Takahashi .................. 358/1.13

FOREIGN PATENT DOCUMENTS

EP 965950 A2 * 12/1999
JP 09139794 A * 5/1997
JP 09312752 A * 12/1997
JP 10063451 A * 3/1998

* cited by examiner

*Primary Examiner*—Gabriel I. Garcia
*Assistant Examiner*—Thierry L. Pham
(74) *Attorney, Agent, or Firm*—Robert E. Bushnell, Esq.

(57) ABSTRACT

There is provided a method of storing an initial use date of a printer and informing the initial use date. To store the initial use date, it is determined whether the printer is used for the first time. If the printer is used for the first time, the initial use date is stored in a storage of the printer. Thus, a repairman can easily estimate a guarantee period for the printer based on the initial use date stored in the storage of the printer.

1 Claim, 7 Drawing Sheets

<NVRAM>

METHOD OF STORING INITIAL USE DATE OF PRINTER AND INFORMING THE DATE

CLAIM OF PRIORITY

This application makes reference to, incorporates the same herein, and claims all benefits accruing under 35 U.S.C. §119 from my application entitled FIRST USING DATE STORE AND GUIDE METHOD FOR PRINTER filed with the Korean Industrial Property Office on Jan. 20, 2000 and there duly assigned Serial No. 2000-2576.

BACKGROUND OF THE INVENTION

1. Field of the Invention

The present invention relates generally to a printer, and in particular, to a method of informing the date when a printer is sold.

2. Description of the Related Art

In general, a repairman or a user estimates how long a printer was used by counting the total number of pages that the printer has printed. Some users use printers more frequently than others. Therefore, it is not proper to decide as to whether a guarantee period for the printer has expired based on the estimated use period of the printer.

U.S. Pat. No. 5,283,661 for a Method and Apparatus For Assisting In The Installation of a Facsimile Machine to Klees discloses storing a warranty date in SRAM of a facsimile machine. Such information can be used by a service technician working on the machine. However, I have not seen storing the initialization date for a printer in non-volatile memory.

SUMMARY OF THE INVENTION

It is, therefore, an object of the present invention to provide a method of storing an initial use date of a printer and informing the date in order to easily find out how long the printer can be guaranteed.

It is also an object of the present invention to allow a repair man to estimate the guarantee period of a printer based on the initial use date of the printer. For this purpose, the initial date of the printer is stored and notified to the repair man.

It is further an object to store the initial date of operation of a printer in a memory of the printer.

It is still an object to provide the initial date of operation from a host computer to which the printer is electrically attached to.

The above object can be achieved by providing a method of storing an initial use date of a printer and informing the initial use date. To store the initial use date, it is determined whether the printer is used for the first time. If the printer is used for the first time, the initial use date is stored in a storage of the printer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
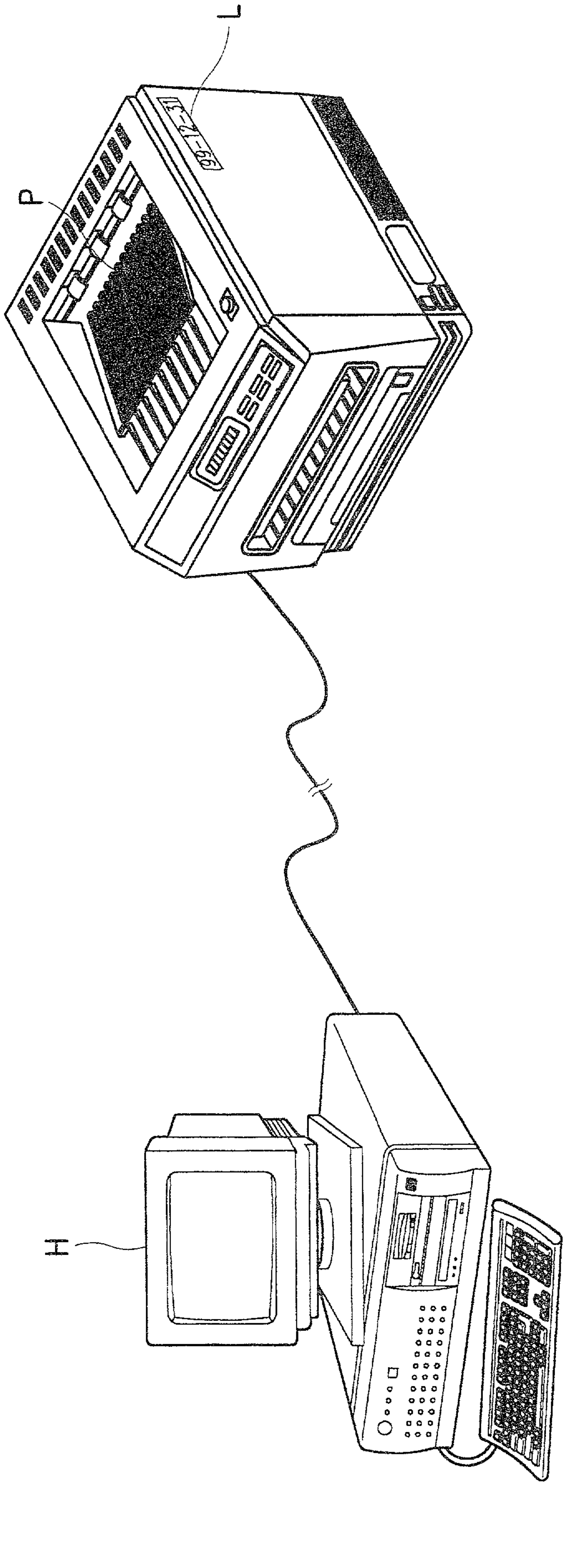
FIG. 1 illustrates a printer with a label indicating its selling date attached thereto.

A label L with a selling date is attached to a printer P as shown in FIG. 1 or the selling data is written in a letter of quality guarantee in a conventional method. This method, however, is not always performed in the market. Consequently, the repairman has difficulty in finding out when a guarantee period expires.

Figure 2:
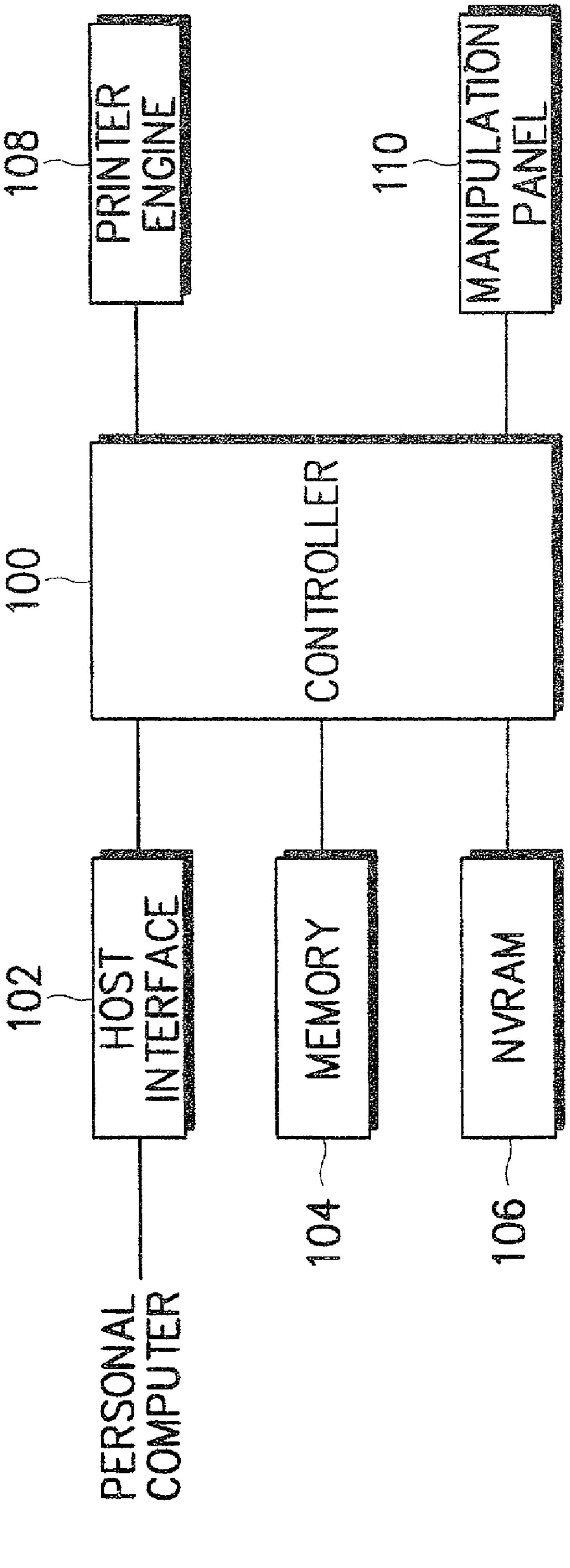
FIG. 2 is a block diagram of a printer to which the present invention is applied.
Figure 3:
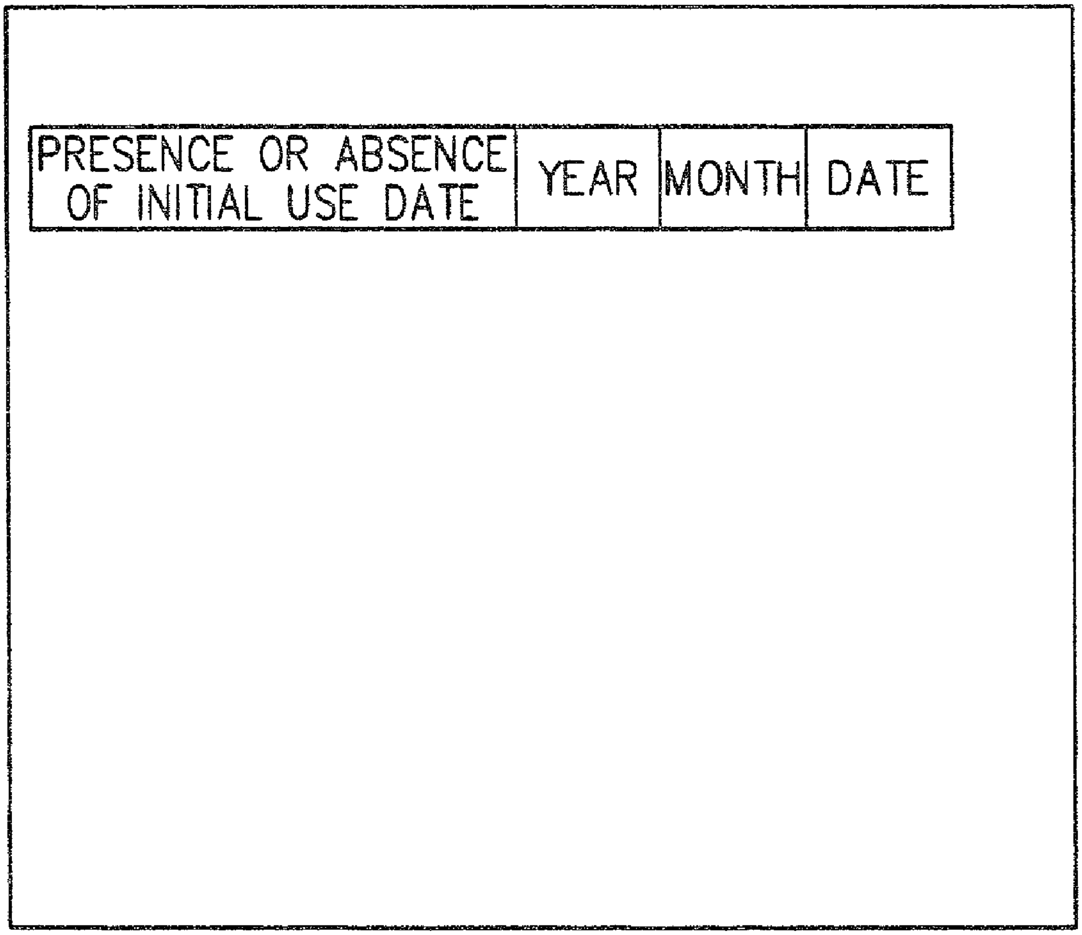
FIG. 3 illustrates data stored in a non-volatile RAM (NVRAM) shown in FIG. 2 according to a preferred embodiment of the present invention.

FIG. 2 is a schematic block diagram of a printer to which the present invention is applicable. Referring to FIG. 2, a controller 100 provides overall control to the printer and particularly, stores information about the initial use date of the printer received from a PC in an NVRAM 106 according to a preferred embodiment of the present invention. Information about the initial use date provides data about the presence or absence of the initial use date and the initial use year/month/date. The initial use date information is stored in a predetermined area of the NVRAM 106, as shown in FIG. 3.

A host interface 102 interfaces between a host like a PC and the controller 100. A memory 104 stores the operating program of the controller 100 and various pieces of information and temporarily stores data generated during executing the program. The NVRAM 106 stores information associated with printer management, the initial use date information of the printer as shown in FIG. 3 according to the preferred embodiment of the present invention. A printer engine 108 prints under the control of the controller 100. A manipulation panel 110 has a key pad by which a user enters commands and a display to provide information to the user.

Figure 4:
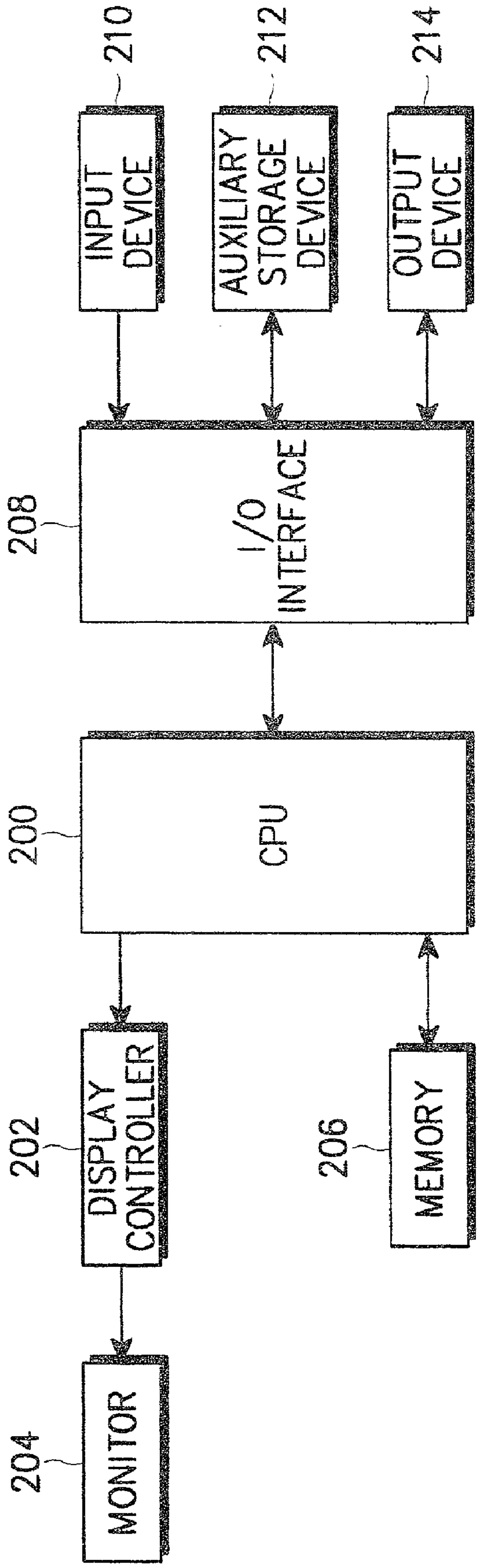
FIG. 4 is a block diagram of a personal computer (PC) to which the present invention is applied.

A PC can be connected to the thus-constituted printer. FIG. 4 is a schematic block diagram of a PC to which the present invention is applicable. Referring to FIG. 4, a CPU 200 provides overall control to the PC by executing a predetermined program. A display controller 202 displays information processed by the CPU 200 on a monitor 204 under the control of the CPU 200. A memory 206, including at least one ROM and at least one RAM, stores the operating program of the CPU 200 and temporarily stores data processed by the CPU 200. An input/output (I/O) interface 208 interfaces signals between an auxiliary storage device 212 and an output device 214. An input device 210 may be a key board or a mouse to enter information or commands. A hard disk drive, a floppy disk drive, and etc. may be used as the auxiliary storage device 212. A printer or a plotter can be used as the output device 214 to output information processed by the CPU 200. That is, the printer of FIG. 2 can be the output device 214 shown in FIG. 4.

Figure 5:
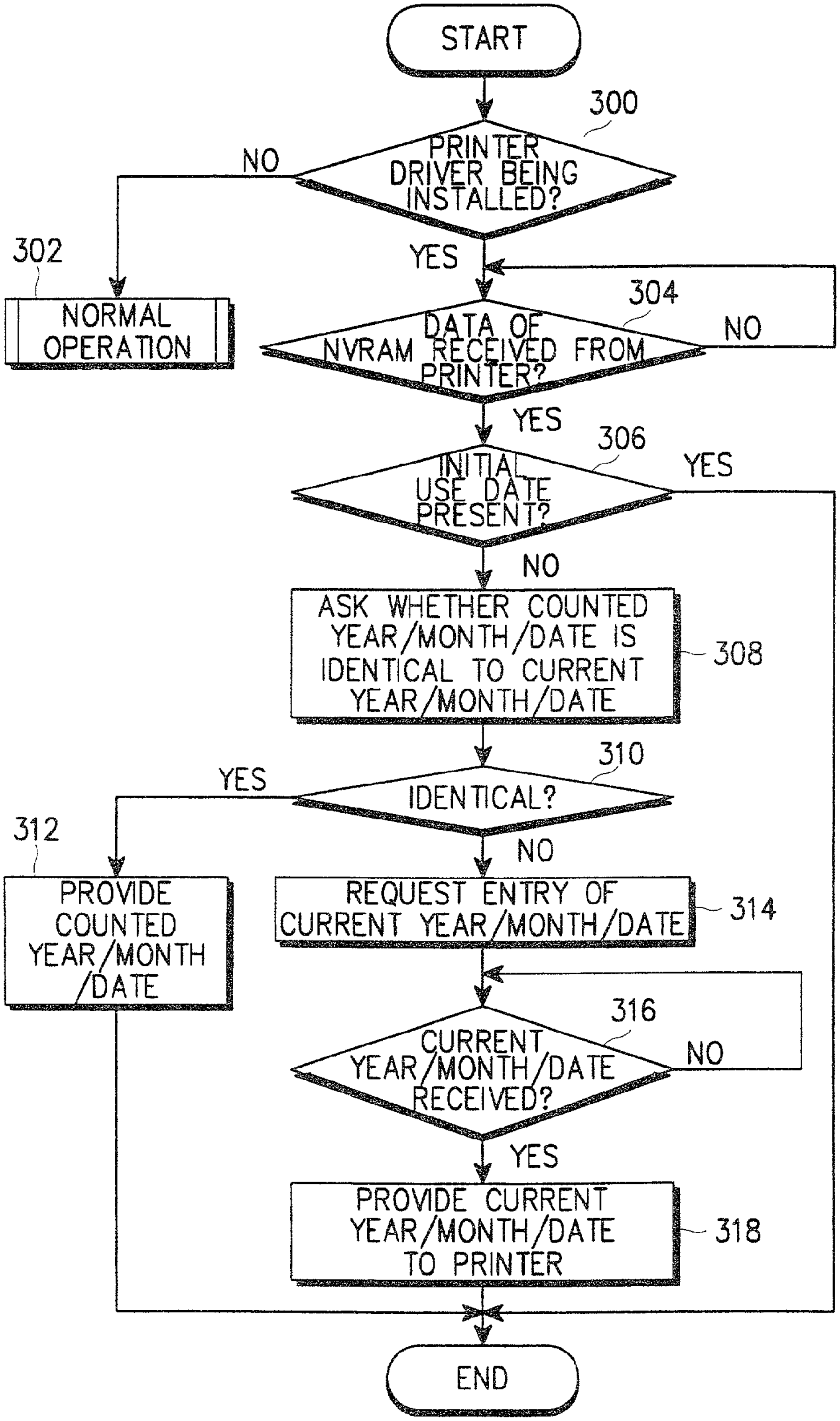
FIG. 5 is a flowchart illustrating the operation of the PC in a process of storing the initial date of the printer according to the preferred embodiment of the present invention.

FIG. 5 is a flowchart illustrating the operation of the PC in a method of storing the initial use date of the printer. Referring to FIG. 5, the CPU 200 checks whether a printer driver is being installed in step 300. The printer driver installation is usually performed when the printer is on or prints. During the installation, the PC usually requests the printer to transmit data stored in the NVRAM 106 and then the printer provides the data to the PC in response to the request.

The CPU 200 determines whether the requested data has been received from the printer during the installation in progress in step 304. Upon receipt of the requested data, the CPU 200 determines whether the initial use date of the printer has been stored referring to the data indicating whether the initial use date was stored or not in step 306. If the initial use date was stored, the CPU 200 continues the installation of the printer driver. If the requested data is not received from the printer due to disconnection to the printer or power-off of the printer, the PC ends the printer driver installation.

If it turns out that the initial use date was not stored in step 306, the CPU 200 displays a message asking whether a year/month/date counted by an internal timer is identical to the current year/month/date, for example "Is it Dec. 31, 1999?", on the monitor 204. The user answers the question through the input device 210.

If the user answers in the positive, the CPU provides the counted year/month/date as the initial use date to the printer so that the printer stores the information in the predetermined area of the NVRAM 106 and continues the printer driver installation in step 312.

If the user answers in the negative, the CPU 200 displays a message requesting the user to enter the current year/month/date on the monitor 204 in step 314. Then, the CPU 200 determines whether the user has entered the current year/month/date in step 316. Upon receipt of the current year/month/date from the user, the CPU 200 provides the received current year/month/date as the initial use date of the printer so that the printer stores the information in the predetermined area of the NVRAM 106 in step 318. Upon termination of the printer driver installation, which is needed for printing, the PC provides printing data to the printer.

Figure 6:
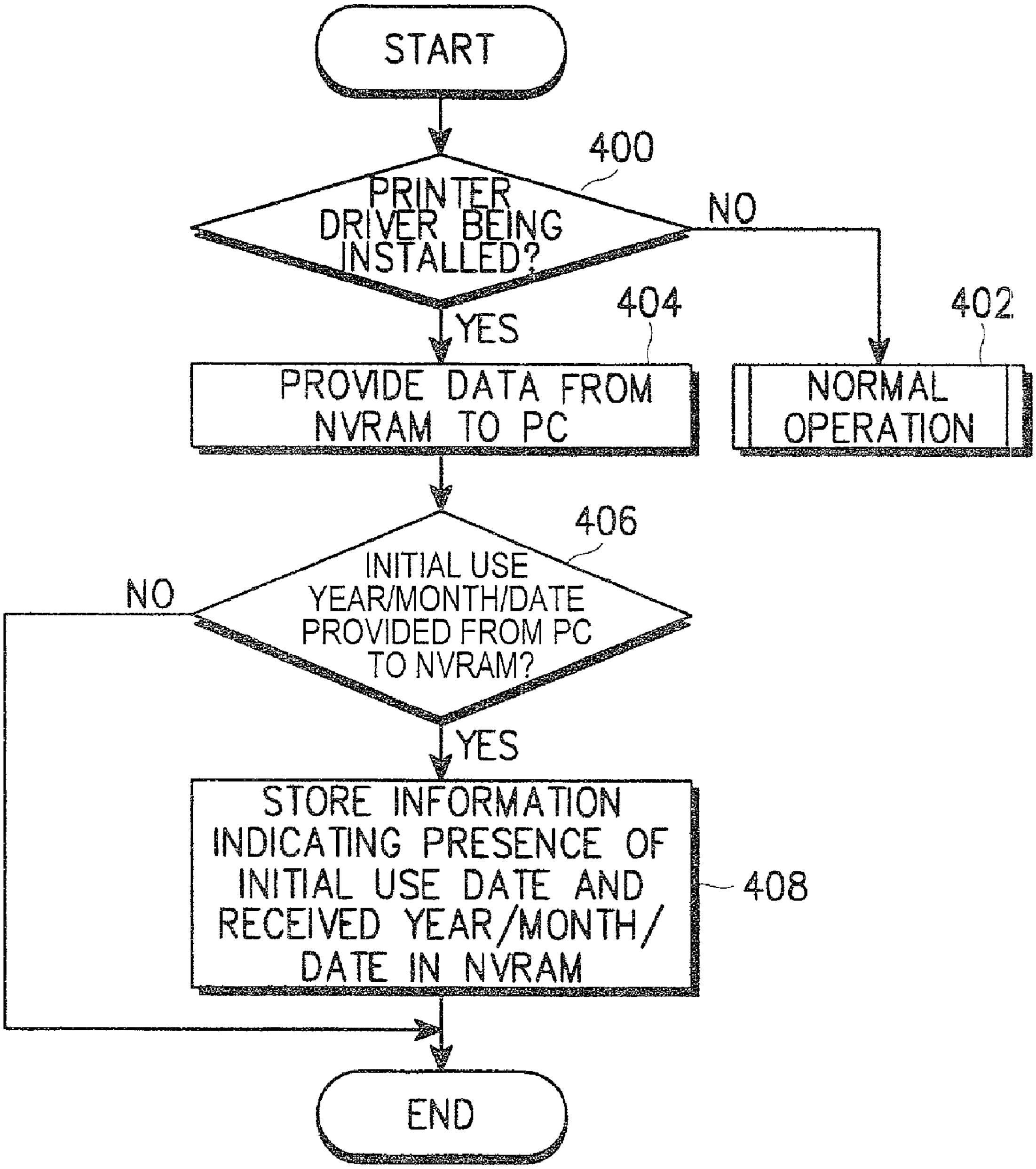
FIG. 6 is a flowchart illustrating the operation of the printer in the process of storing the initial date of the printer according to the preferred embodiment of the present invention.

Now, there will be given a description of a method of storing the initial use date received from the PC in the NVRAM 106 in the printer with reference to FIG. 6. In step 400, the controller 100 determines whether the printer driver installation is in progress. Unless the printer driver installation is in progress, the controller 100 performs a normal operation in step 402. If the printer driver installation is in progress, the controller 100 reads data recorded in the NVRAM 106 and provides the read data to the PC in step 404. Then, the controller 100 checks whether the year/month/date information stored in a predetermined area of the NVRAM 106 is provided to the PC for a predetermined time in step 406. For the predetermined period that can be set by the user or the manufacturer of the printer, the PC finds out that the initial use date was not stored in the printer and provides the initial use date to the printer.

If the printer fails to receive the initial use date expressed in year/month/date from the PC within a predetermined period of time, the controller 100 continues the printer driver installation. Otherwise, the controller 100 stores the received year/month/date information in a predetermined area of the NVRAM 106 and records information indicating that the initial use date was stored in the predetermined area.

Figure 7:
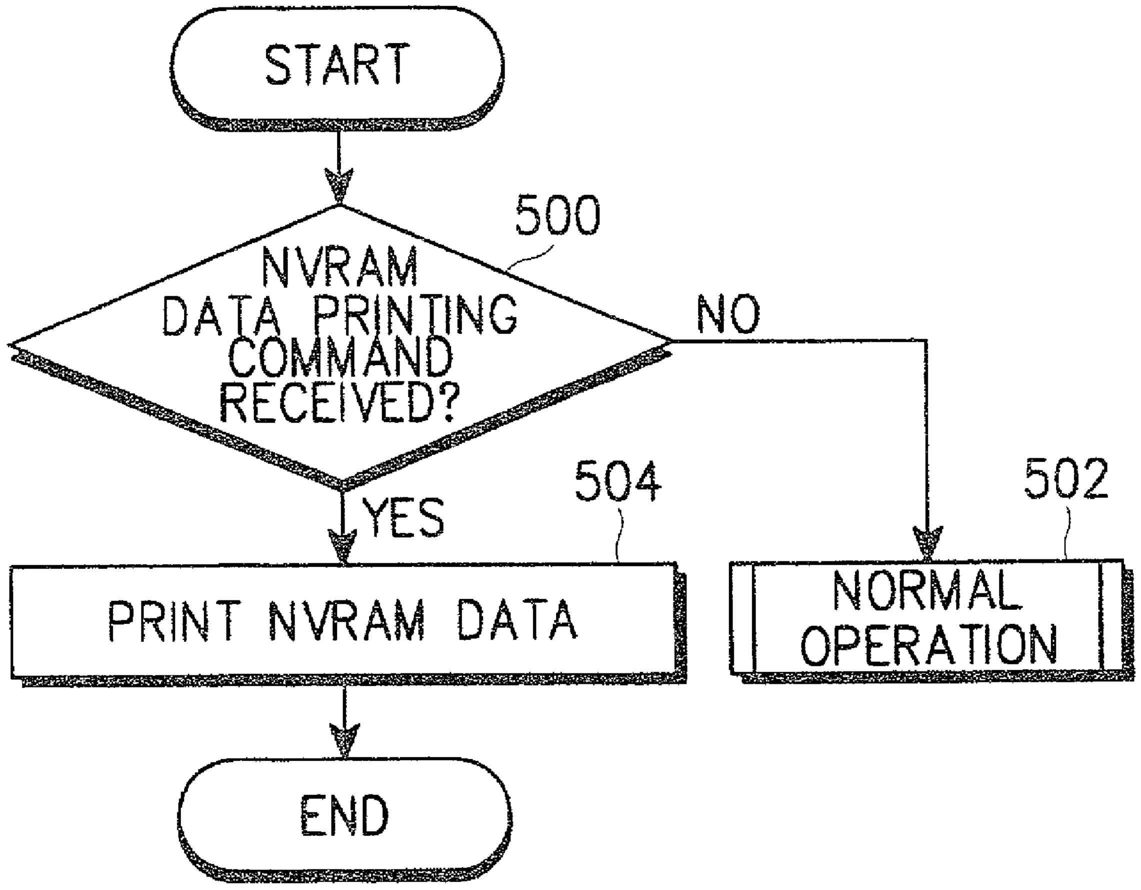
FIG. 7 is a flowchart illustrating a method of informing the initial use date of the printer according to the preferred embodiment of the present invention.

A method of informing the initial use date will be described referring to FIG. 7. The controller 100 of the printer determines whether a command (e.g., "NVRAM DUMP") requesting printing data stored in the NVRAM 106 has been received from a repairman or anyone else through the manipulation panel 110 in step 500. Upon receipt of the data printing command, the controller 100 prints the data including the initial use year/month/date from the NVRAM 106 in step 504. Thus the repairman checks the initial use year/month/date from the printed data and estimates a guarantee period set for the printer based on the initial use year/month/date.

As described above, the present invention stores the initial use date of a printer in an NVRAM thereof to allow a repairman to readily and accurately find out until when a printer can be guaranteed in quality based on the initial use date.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of initializing a printer attached to a host, comprising:

connecting said printer to said host;

applying power to both said host and said printer;

installing a printer driver into said host;

sending data from a memory space in said printer to said host;

determining whether said printer has an initial date stored in said memory of said printer; and typing in an initial start date by a user into said host when said initial date is absent from said memory of said printer, said memory space comprising a first area and a second area separate from the first area, the initial date being stored in the second area and an indicator being stored in the first area that indicates whether or not an initial date has been stored in the second area, said determining step examining the contents of the first area and not the second area.

* * * * *